Aug. 13, 1963     P. B. FONDEN ETAL     3,100,613
AIRCRAFT RESTRAINING DEVICE
Filed Dec. 12, 1960     2 Sheets-Sheet 1
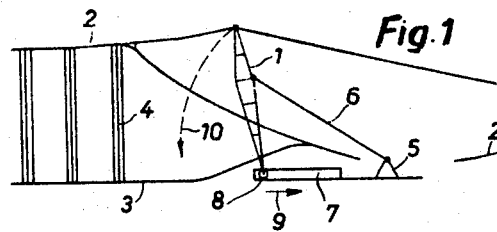
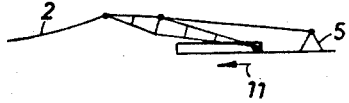
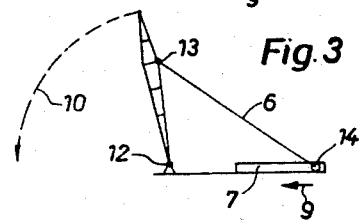
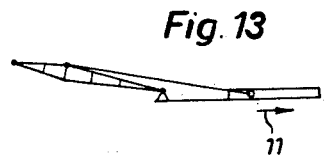
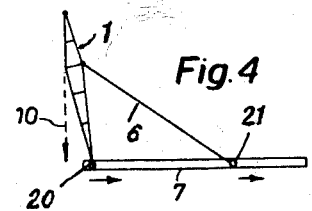
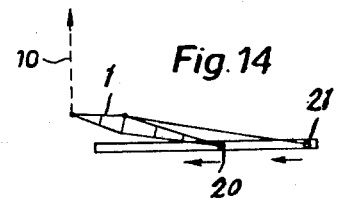
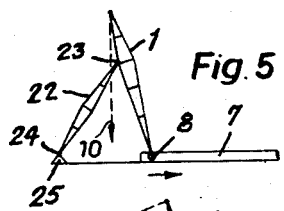
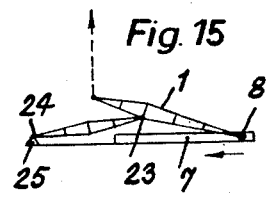
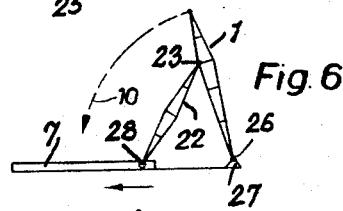
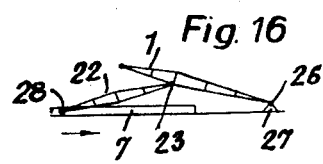
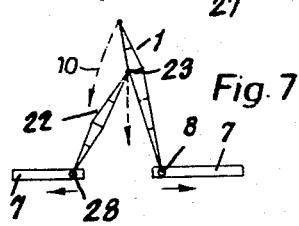
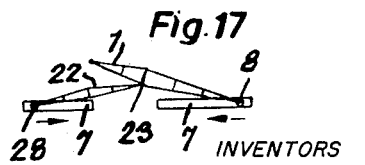
INVENTORS
PER BORJE FONDEN
KARL OVE TORGNY WALANDER
BY
*Eric H. Munson*
*Attorney*

Aug. 13, 1963  P. B. FONDEN ETAL  3,100,613
AIRCRAFT RESTRAINING DEVICE
Filed Dec. 12, 1960  2 Sheets-Sheet 2
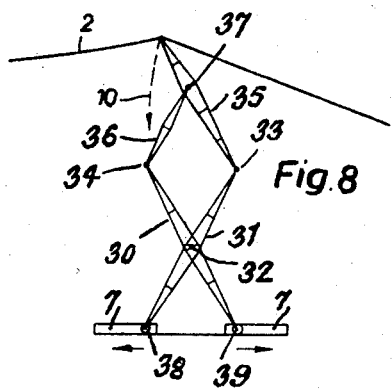
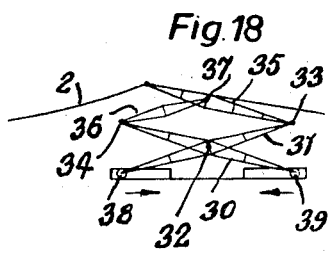
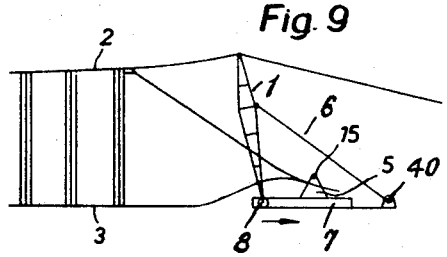
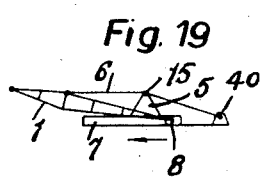
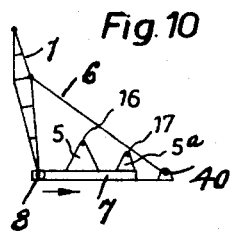
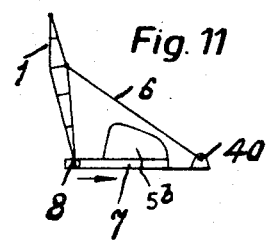
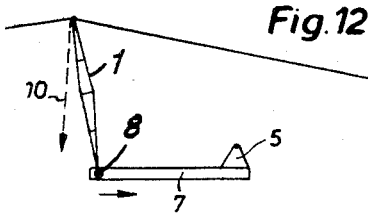
INVENTORS
PER BORJE FONDEN &
KARL OVE TORGNY WALANDER
BY
Attorney

United States Patent Office 3,100,613
Patented Aug. 13, 1963

3,100,613
AIRCRAFT RESTRAINING DEVICE
Per Borje Fonden, Gotgatan 23, and Karl Ove Torgny Walander, Vasavagen 49, both of Linkoping, Sweden
Filed Dec. 12, 1960, Ser. No. 75,149
11 Claims. (Cl. 244—110)

The present invention relates to wire or rope structures such as are particularly adapted for restraining aircraft and preventing the same from moving off a runway or other surface.

Structures of this character consist of two or more horizontally-disposed wires, the upper one of which extends between masts that are mounted for raising and lowering movement. These horizontal wires are connected by vertical wires or other strands, thus resulting in the production of a type of netting to capture and restrain an aircraft. The present invention has for one of its objects the provision of means by which the masts can be raised from a substantially ground level position to an erect position to thereby bring the wires into an aircraft-engaging position.

One of the objects of the invention is to provide means by which the mast height can be increased; to provide a mast construction and an erecting and lowering means by which the movements of the mast can be controlled in a manner to cause the top of the mast to be either moved through an arc or moved along a relatively straight and vertical line during its up and down travel.

It is an object of the invention to provide means for dampening the movements of the mast when the same is being raised or lowered, and to possess other advantages apparent to those skilled in this art.

With these and other objects to be hereinafter set forth in view, we have devised the arrangement of parts to be described and more particularly pointed out in the claims appended hereto.

In the accompanying drawings, wherein an illustrative embodiment of the invention is disclosed, FIG. 1 shows diagrammatically, a construction made in accordance with the invention, and with one of the masts in its erect position;

FIG. 2 shows the mast in its collapsed or lowered position;

FIGS. 3 and 13 show another embodiment of the invention; FIG. 3 showing the mast in its upright position and FIG. 13 showing the same in its lowered position;

FIGS. 4 and 14 show another embodiment of the invention, the mast of FIG. 4 being shown in its upright position and in FIG. 14 in its lowered position;

FIGS. 5 and 15 show still another embodiment of the invention, with the mast thereof in an erected position in FIG. 5 and in a lowered position in FIG. 15;

FIGS. 6 and 16 show another embodiment of the invention; FIG. 6 showing the mast raised and FIG. 16 showing the mast in lowered position;

FIGS. 7 and 17 show still another embodiment, with the mast raised in FIG. 7 and lowered in FIG. 17;

FIGS. 8 and 18 show a structure in which the mast elements or sections are provided with a toggle joint arrangement; the mast being shown erected in FIG. 8 and in a collapsed or lowered position in FIG. 18;

FIGS. 9 and 19 show another embodiment of the invention, FIG. 9 showing the mast raised and FIG. 19 showing the same in a lowered position and FIGS. 10, 11 and 12 show other modified constructions.

Referring to the drawings, and more particularly to FIGS. 1 and 2 thereof, 1 designates a mast, which may be of a skeleton structure as shown or of any other suitable construction, and the same is connected to a horizontal top wire 2, extending from another mast. This connection to the top wire is at the top of the mast, and a bottom wire is shown at 3. Vertical wires 4, arranged at suitably spaced intervals extend between the horizontal wires 2 and 3 and co-operate therewith to form a net structure.

A stationary block or plinth 5 is located at a distance from the mast, and extending between the block or plinth and the mast, is a stay member 6 which may consist of a wire or an articulated rod. The lower or foot end of the mast, in this embodiment, is arranged for horizontal movement, or perhaps on a sloping plane substantially flush with ground level. The lower end of the mast carries a roller 8 which is mounted for controlled movement in a guideway or track 7. To lower the mast, the same is subjected at its foot or lower end by means of a wire not shown or by other means, to a force acting in the direction of the arrow 9, causing the lower end of the mast to be moved to the left, the mast then swinging downwardly through an arc as indicated by the dotted line 10 in FIG. 1. The lowered or collapsed position of the mast is shown in FIG. 2.

To raise the mast from the lowered or collapsed position shown in FIG. 2, requires the movement of the lower end of the mast toward the right or in the direction of the arrow 11 in FIG. 2. This will cause the erection of the mast, since the stay 6, connected at one end to the top of the block or plinth 5 and at its other end to the mast near the top thereof, will act to pull the mast upright when the lower end of the mast is moved to the limits of the guiding track 7.

In the embodiment of the invention shown in FIGS. 3 and 13, the mast has its lower end pivotally mounted in a fixed location 12. The stay 6 has one end attached at 13 to a point near the top of the mast and its other end pivotally connected at 14 to a roller or other movable or slidable element that is movable within the limits of the guideway or track 7. In this construction, the force required to collapse or lower the mast is applied to the lower end 14 of the stay 6, the direction of the force required to erect the mast being shown by the arrow 9, and the direction of the force to lower the mast being indicated by the arrow 11 in FIG. 13.

If conditions require that upon the raising or lowering of the mast, the top end of the same should be moved downwardly or upwardly along a substatnially vertical line, the construction shown in FIGS. 4 and 14 can be employed. Therein, the lower end of the mast is pivotally connected to a roller 20, and the lower end of the stay 6 is also connected to a roller, shown at 21, the two rollers 20 and 21 being movable within the limits of a guideway or track 7.

In the embodiments shown in FIGS. 5 and 15, the lower end of the mast 1 is provided with a roller 8 movable in the guideway or track 7. A brace member 22, has one end pivotally connected at 23 to the mast 1 near its upper end, and it has its lower end pivotally connected at 24 to a block or plinth 25. In its collapse, the lower end of the mast will move as indicated by the arrow in FIG. 5 to the position shown in FIG. 15, during which time a downward swing of the brace member 22 will be permitted by its pivotal connections 23 and 24.

FIGS. 6 and 16 show a construction somewhat similar to that disclosed in FIGS. 5 and 15 except that the lower end of the mast 1 is pivoted at a 26 to a fixed block or plinth 27, while the lower end of the brace member 22 is connected to a roller 28 operative in the guideway or track 7. In the erection of the mast in this embodiment, the lower end of the brace member 22 is moved to the right, or in the direction of the arrow shown in FIG. 16, which movement will cause the elevation of the mast. Movement of the lower end of the brace member 22 toward the left, as indicated by the arrow shown in FIG. 6, will cause lowering movement of the mast to the position shown in FIG. 16.

In the construction shown in FIGS. 7 and 17, the lower end of the mast 1 is provided with the roller 8 as shown in the embodiment of FIG. 1, riding in the guideway or track 7. The brace member 22 is pivotally connected at one end, as shown at 23 to the upper portion of the mast, and has its opposite end provided with the roller 28 riding in the guideway or track 7. In this construction, the erection of the mast is attained by movement of the lower ends of the mast and brace member toward one another, or in the direction of the arrows shown in FIG. 17. To lower the mast, the rollers 8 and 28 are moved in a direction away from one another as indicated by the arrows in FIG. 7.

In FIGS. 8 and 18 is shown a mast of a toggle or lazy-tong formation. The lower mast sections, indicated respectively at 30 and 31, have their lower end provided with the rollers 38 and 39 which are movable in the guideways or tracks 7. These lower mast sections 30 and 31 are pivotally connected together midway of their length, as indicated at 32. Pivotally attached at 33 to the upper end of the mast section 31 is an upper mast section 35, and pivotally attached near the upper end of the same, at the point indicated at 37, is the upper end of a brace member or strut 36. The lower end of said brace member is pivotally attached at 34 to the upper end of the mast section 30. This arrangement is such that when the lower ends of the mast sections 30 and 31 are spread apart, as indicated by the arrows in FIG. 8, the mast sections 30 and 31 will scissor downwardly to the position shown in FIG. 18, bringing the upper mast section 35 and the brace member 36 therefor, down to the lowered position shown in FIG. 18. By movement of the lower ends of the mast sections 30 and 31 toward one another, or in the direction shown by the arrows in FIG. 18, the parts of the structure will be extended to the position shown in FIG. 8.

The construction shown in FIGS. 9 and 19 is somewhat similar to that shown in FIGS. 1 and 2, except that one end of the stay 6, which is in this instance a flexible cable or an articulated rod, is attached at a lower point 40 to a fixed element. Located between the point of connection 40 of the stay and the opposite end of the stay, is a plinth 15 which has its upper end, designated at 15, used as a flexing point for the stay, as shown in FIG. 19, when the mast descends to its lowered position.

In FIG. 10 two plinths, shown respectively at 5 and 5a, are shown and the stay is arranged to flex across the same upon the lowering movement of the mast.

In FIG. 11 a plinth or block 5b is shown, and the same is of such a shape that it presents flexing surface for the stay along a curved line. With such an arrangement it is possible to create a gradually leveling erection curve and similarly increasing leverage during the erection movement.

In FIG. 12 is shown a relatively lengthy stay wire 6 anchored at 41 at a point relatively distant from the mast. In this construction, one end of the stay is attached at the extreme upper end of the mast 1. Upon the erection of the mast or during its lowering movement, the top of the mast will move along a steep curve as indicated by the dotted line 10 in FIG. 12.

The constructions shown in the several embodiments of the invention are such as to enable the mast to be quickly raised or lowered and in such a manner that the upper end of the mast can swing through an arc in its movements or can move up and down on a substantially vertical line.

Having thus described several embodiments of the invention, it is obvious that the same is not to be restricted thereto, but is broad enough to cover all structures coming within the scope of the annexed claims.

What we claim is:

1. An apparatus for raising and lowering the masts of an aircraft-restraining device comprising a mast to which aircraft-restraining wires are connected, the mast having a pivot at its lower end, a stay having its upper end attached to the mast and having a pivot at its lower end, the pivot at the lower end of the mast being capable of bodily movement in a direction substantially parallel to the surface of the ground on which the structure is mounted said pivot being movable in a direction away from the restraining wires upon the descending movement of the mast.

2. An apparatus for raising and lowering the masts of an aircraft-restraining device as provided for in claim 1, wherein the stay consists of a wire, and a guiding track is provided for controlling the movement of the movable pivot of the mast.

3. An apparatus for raising and lowering the masts of an aircraft-restraining device, as provided for in claim 1, and a track for controlling the movement of said pivot.

4. An apparatus for raising and lowering the masts of an aircraft-restraining device comprising, a pair of horizontally-extending wires, the upper wire thereof being attached at one end to a mast, said wires being joined by a plurality of vertical strands, the mast being pivoted at its lower end, said pivot being movable to a limited extent in a direction substantially parallel to the surface of the ground, and a stay pivotally attached at one end to the mast and at its other end to an element located at a distance above ground level.

5. An apparatus for raising and lowering the masts of an aircraft-restraining device comprising, a mast pivoted at its lower end, a roller mounted on the pivot, a track mounted on the ground and on which the roller has a limited horizontal movement, a stay having one end attached to the mast near the upper end of the same, a fixed element raised above the ground and to which the other end of the stay is attached.

6. An apparatus for raising and lowering the masts of an aircraft-restraining device comprising, a mast pivoted at its lower end, a stay having one end attached to the mast near its upper end, a roller to which the opposite end of the stay is attached, and a guideway in which the roller is mounted for horizontal movement.

7. An apparatus for raising and lowering the masts of an aircraft-restraining device comprising, a mast pivoted at its lower end, means at said end for guiding the same through a limited horizontal movement, a flexible stay having one end attached to the mast near the top of the mast and having its other end fixedly attached at a point remote from the mast, and an elevated support located between the said point and the mast and over which the stay is flexed when the mast is moved to a lowered position.

8. An apparatus for raising and lowering the masts of an aircraft-restraining device comprising the structure set forth in claim 7, and including a second support over which the stay is flexed, said second support being of lesser height than the first support.

9. An apparatus for raising and lowering the masts of an aircraft-restraining device as provided for in claim 7, wherein the support is provided with rounded surfaces over which the stay is tensioned on the lowering movement of the mast.

10. In an apparatus for raising and lowering the masts of an aircraft-restraining device comprising, a mast adapted in its raised position to be nearly vertical, aircraft-restraining wires connected to the mast, a stay having its upper end attached to the mast and having a pivot at its lower end, the mast being pivoted at its lower end said last-mentioned pivot for the mast being capable of bodily movement in a direction substantially parallel to the surface of the ground on which the structure is mounted, so that the mast upon its descent will cause its pivot to be bodily shifted in a manner to cause the top end of the mast to be projected from the original position of the pivot for a distance less than the overall length of the mast.

11. An apparatus for raising and lowering the masts of an aircraft-restraining device comprising, a mast pivoted at its lower end, said pivoted end being capable of limited horizontal movement, a brace member pivotally connected at one end to the mast and pivoted at its lower end, the pivot at the lower end of the brace member being capable of limited horizontal movement whereby it can be moved to or from the pivot of the mast.

References Cited in the file of this patent

UNITED STATES PATENTS

| | | |
|---|---|---|
| 1,009,222 | Castelli | Nov. 21, 1911 |
| 2,913,197 | Fonden et al. | Nov. 17, 1959 |

FOREIGN PATENTS

| | | |
|---|---|---|
| 650,925 | France | Oct. 2, 1928 |
| 578,440 | Great Britain | June 28, 1946 |